(12) United States Patent
Stoewe et al.

(10) Patent No.: US 7,201,441 B2
(45) Date of Patent: Apr. 10, 2007

(54) AIR CONDITIONED SEAT AND AIR CONDITIONING APPARATUS FOR A VENTILATED SEAT

(75) Inventors: Stefan Stoewe, Mering (DE); Rainer Spee, Augsburg (DE)

(73) Assignee: W.E.T. Automotive Systems, AG, Odelzhausen (DE)

( * ) Notice: Subject to any disclaimer, the term of this patent is extended or adjusted under 35 U.S.C. 154(b) by 0 days.

(21) Appl. No.: 10/738,485

(22) Filed: Dec. 17, 2003

(65) Prior Publication Data
US 2004/0164594 A1  Aug. 26, 2004

(30) Foreign Application Priority Data
Dec. 18, 2002 (DE) ................ 102 59 648

(51) Int. Cl.
*A47C 13/00* (2006.01)

(52) U.S. Cl. .................. 297/180.14; 297/180.1; 297/180.13; 297/452.42; 297/452.46

(58) Field of Classification Search ......... 297/180.1 X, 297/180.13 X, 180.14 R, 452.42 X, 452.46 X, 297/452.47
See application file for complete search history.

(56) References Cited

U.S. PATENT DOCUMENTS

| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |

(Continued)

FOREIGN PATENT DOCUMENTS

CA  1266925  7/1960

(Continued)

OTHER PUBLICATIONS

Automotive Heated Seats—Heated Steering Wheels, IGB Automotive Ltd., received by Assignee W.E.T. Automotive Systems, May 2003.

(Continued)

*Primary Examiner*—Laurie K. Cranmer
(74) *Attorney, Agent, or Firm*—Dobrusin & Thennisch PC

(57) ABSTRACT

An air conditioned seat with a padded seat surface (4) and a padded backrest (8) and with a fan (16) arranged beneath the seat surface (4). The fan (16) is connected to an air distribution apparatus (20, 22) in the seat, and includes a flow region (31) that is open to the environment. The flow region (31) is located substantially on the side of the fan (16) facing the seat surface (4). The fan inlet (30) is further environmentally protected by a diffuser (36) located in the flow region (31) and forming a slit opening (40) between a top edge (38) of the diffuser (36) and an underside (28) of the seat.

22 Claims, 2 Drawing Sheets

U.S. PATENT DOCUMENTS

| | | |
|---|---|---|
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |
| 2,749,906 A | 6/1956 | O'Connor |
| 2,758,532 A | 8/1956 | Awe |
| 2,782,834 A * | 2/1957 | Vigo ..................... 297/180.14 |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,137,523 A | 6/1964 | Karner |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,628,829 A | 12/1971 | Hellig |
| 3,638,255 A | 2/1972 | Sterrett |
| 3,653,589 A | 4/1972 | McGrath |
| 3,653,590 A | 4/1972 | Elsea |
| 3,681,797 A | 8/1972 | Messner |
| 3,684,170 A | 8/1972 | Roof |
| 3,732,944 A | 5/1973 | Kendall |
| 3,736,022 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,044,221 A | 8/1977 | Kuhn |
| 4,060,276 A | 11/1977 | Lindsay |
| 4,065,936 A | 1/1978 | Fenton et al. |
| 4,072,344 A | 2/1978 | Li |
| 4,141,585 A | 2/1979 | Blackman |
| 4,175,297 A | 11/1979 | Robbins et al. |
| 4,245,149 A | 1/1981 | Fairlie |
| 4,259,896 A * | 4/1981 | Hayashi et al. ............. 454/120 |
| 4,268,272 A | 5/1981 | Taura |
| 4,335,725 A | 6/1982 | Geldmacher |
| 4,379,352 A | 4/1983 | Hauslein et al. |
| 4,391,009 A | 7/1983 | Schild et al. |
| 4,413,857 A | 11/1983 | Hayashi |
| 4,509,792 A | 4/1985 | Wang |
| 4,563,387 A | 1/1986 | Takagi et al. |
| 4,572,430 A | 2/1986 | Takagi et al. |
| 4,589,656 A | 5/1986 | Baldwin |
| 4,665,707 A | 5/1987 | Hamilton |
| 4,671,567 A | 6/1987 | Frobose |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,964,674 A | 10/1990 | Altmann et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,076,643 A | 12/1991 | Colasanti et al. |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,516,189 A | 5/1996 | Ligeras |
| 5,524,439 A | 6/1996 | Gallup et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,639,145 A | 6/1997 | Alderman |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,887,304 A | 3/1999 | Von der Heyde |
| 5,897,162 A | 4/1999 | Humes et al. |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A * | 12/1999 | Larsson ................. 297/452.42 |
| 6,019,420 A | 2/2000 | Faust et al. |
| 6,048,024 A * | 4/2000 | Wallman ............... 297/180.14 |
| 6,049,927 A | 4/2000 | Thomas et al. |
| 6,059,018 A | 5/2000 | Yoshinori et al. |
| 6,059,362 A | 5/2000 | Lin |
| 6,062,641 A | 5/2000 | Suzuki et al. |
| 6,064,037 A | 5/2000 | Weiss et al. |
| 6,064,641 A * | 5/2000 | Braat .................... 369/112.24 |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,109,688 A | 8/2000 | Wurz et al. |
| 6,119,463 A | 9/2000 | Bell |

| | | |
|---|---|---|
| 6,124,577 A | 9/2000 | Fristedt |
| 6,145,925 A | 11/2000 | Eksin et al. |
| 6,147,332 A | 11/2000 | Holmberg et al. |
| 6,164,719 A | 12/2000 | Rauh |
| 6,179,706 B1 | 1/2001 | Yoshinori et al. |
| 6,186,592 B1 | 2/2001 | Orizaris et al. |
| 6,189,966 B1 * | 2/2001 | Faust et al. ............ 297/180.14 |
| 6,196,627 B1 | 3/2001 | Faust et al. |
| 6,223,539 B1 | 5/2001 | Bell |
| 6,224,150 B1 | 5/2001 | Eksin et al. |
| 6,237,675 B1 | 5/2001 | Oehring et al. |
| 6,254,179 B1 | 7/2001 | Kortume et al. |
| 6,263,530 B1 | 7/2001 | Feher |
| 6,273,810 B1 | 8/2001 | Rhodes et al. |
| 6,277,023 B1 | 8/2001 | Schwartz |
| 6,278,090 B1 | 8/2001 | Fristedt et al. |
| 6,291,803 B1 | 9/2001 | Fourrey |
| 6,300,150 B1 | 10/2001 | Venkatasubramanian |
| 6,321,996 B1 | 11/2001 | Odebrecht et al. |
| 6,415,501 B1 | 7/2002 | Schlesselman et al. |
| 6,425,637 B1 | 7/2002 | Peterson |
| 6,434,328 B2 | 8/2002 | Rutherford |
| 6,478,369 B1 * | 11/2002 | Aoki et al. ............ 297/180.13 |
| 6,481,801 B1 | 11/2002 | Schmale |
| 6,483,087 B2 | 11/2002 | Gardner et al. |
| 6,491,578 B2 | 12/2002 | Yoshinori et al. |
| 6,497,275 B1 | 12/2002 | Elliot |
| 6,501,055 B2 | 12/2002 | Rock et al. |
| 6,505,886 B2 | 1/2003 | Gielda et al. |
| 6,511,125 B1 | 1/2003 | Gendron |
| 6,539,725 B2 | 4/2003 | Bell |
| 6,541,737 B1 | 4/2003 | Eksin et al. |
| RE38,128 E | 6/2003 | Gallup et al. |
| 6,578,910 B2 | 6/2003 | Andersson et al. |
| 6,592,181 B2 | 7/2003 | Stiller et al. |
| 6,598,405 B2 | 7/2003 | Bell |
| 6,604,785 B2 | 8/2003 | Bargheer et al. |
| 6,606,866 B2 | 8/2003 | Bell |
| 6,619,736 B2 | 9/2003 | Stowe et al. |
| 6,625,990 B2 | 9/2003 | Bell |
| 6,626,386 B1 | 9/2003 | Stiner et al. |
| 6,626,455 B2 | 9/2003 | Webber et al. |
| 6,626,488 B2 | 9/2003 | Pfahler |
| 6,629,724 B2 * | 10/2003 | Ekern et al. ............ 297/180.11 |
| 6,629,725 B1 | 10/2003 | Kunkel et al. |
| 6,682,140 B2 | 1/2004 | Minuth et al. |
| 6,685,553 B2 | 2/2004 | Aoki |
| 6,719,624 B2 | 4/2004 | Hayashi et al. |
| 6,722,148 B2 | 4/2004 | Aoki et al. |
| 6,761,399 B2 | 7/2004 | Bargheer et al. |
| 6,767,621 B2 | 7/2004 | Flick et al. |
| 6,786,541 B2 | 9/2004 | Haupt et al. |
| 6,786,545 B2 | 9/2004 | Bargheer et al. |
| 6,793,016 B2 | 9/2004 | Aoki et al. |
| 6,808,230 B2 | 10/2004 | Buss et al. |
| 6,817,675 B2 | 11/2004 | Buss et al. |
| 6,828,528 B2 | 12/2004 | Stöwe et al. |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,886,352 B2 | 5/2005 | Yoshinori et al. |
| 6,892,807 B2 | 5/2005 | Fristedt et al. |
| 6,893,086 B2 | 5/2005 | Bajic et al. |
| 6,929,322 B2 | 8/2005 | Aoki et al. |
| 6,957,545 B2 | 10/2005 | Aoki |
| 6,976,734 B2 | 12/2005 | Stoewe |
| 2001/0035669 A1 | 11/2001 | Andersson et al. |
| 2002/0003363 A1 | 1/2002 | Buss et al. |
| 2002/0017102 A1 | 2/2002 | Bell |
| 2002/0067058 A1 | 6/2002 | Pfahler |
| 2002/0092308 A1 | 7/2002 | Bell |
| 2002/0096915 A1 | 7/2002 | Haupt et al. |
| 2002/0096931 A1 | 7/2002 | White et al. |
| 2002/0105213 A1 | 8/2002 | Rauh et al. |
| 2002/0108381 A1 | 8/2002 | Bell |
| 2002/0139123 A1 | 10/2002 | Bell |
| 2002/0140258 A1 | 10/2002 | Ekern et al. |
| 2002/0148234 A1 | 10/2002 | Bell |
| 2002/0148235 A1 | 10/2002 | Bell |
| 2002/0148236 A1 | 10/2002 | Bell |
| 2002/0148345 A1 | 10/2002 | Hagiwari |
| 2002/0150478 A1 | 10/2002 | Aoki |
| 2003/0005706 A1 | 1/2003 | Bell |
| 2003/0024924 A1 | 2/2003 | Fristedt |
| 2003/0029173 A1 | 2/2003 | Bell et al. |
| 2003/0079770 A1 | 5/2003 | Bell |
| 2003/0084935 A1 | 5/2003 | Bell |
| 2003/0102699 A1 | 6/2003 | Aoki et al. |
| 2003/0150229 A1 | 8/2003 | Aoki et al. |
| 2004/0036326 A1 | 2/2004 | Bajic |
| 2004/0104607 A1 | 6/2004 | Takeshi et al. |
| 2004/0118555 A1 | 6/2004 | Fristedt |
| 2004/0139758 A1 | 7/2004 | Toshifumi et al. |
| 2004/0189061 A1 | 9/2004 | Hartwick et al. |
| 2004/0195870 A1 | 10/2004 | Bohlender et al. |
| 2004/0245811 A1 | 12/2004 | Bevan et al. |
| 2005/0200179 A1 | 9/2005 | Bevan et al. |
| 2005/0257541 A1 | 11/2005 | Kadle et al. |
| 2005/0264086 A1 | 12/2005 | Lofy et al. |

FOREIGN PATENT DOCUMENTS

| | | |
|---|---|---|
| CA | 2393970 | 6/2001 |
| DE | 101 16 45 A1 | 7/1957 |
| DE | 3513909 | 10/1986 |
| DE | 37 05 756 | 10/1988 |
| DE | 41 12 631 | 4/1992 |
| DE | 19503291 | 8/1996 |
| DE | 19634370 | 3/1998 |
| DE | 197 36 951 | 3/1999 |
| DE | 197 37 636 | 3/1999 |
| DE | 19805174 | 6/1999 |
| DE | 198 10 936 | 9/1999 |
| DE | 199 20 451 | 12/1999 |
| DE | 199 54 97 | 1/2001 |
| DE | 100 01 314 | 7/2001 |
| DE | 100 24 880 | 9/2001 |
| DE | 10013492 | 9/2001 |
| DE | 10030708 | 1/2002 |
| DE | 10144839 | 3/2003 |
| DE | 10241571 | 3/2004 |
| DE | 10261902 | 8/2004 |
| DE | 10316732 | 10/2004 |
| DE | 10338525 | 3/2005 |
| DE | 10346064 | 4/2005 |
| EP | 0 128 534 | 12/1984 |
| EP | 0 280 213 | 8/1988 |
| EP | 0 517 615 | 12/1992 |
| EP | 411375 | 5/1994 |
| EP | 0809576 | 5/1999 |
| EP | 0 936 105 | 8/1999 |
| EP | 0 730 720 | 7/2000 |
| EP | 1088696 | 9/2000 |
| EP | 1050429 | 11/2000 |
| EP | 1123834 | 2/2001 |
| EP | 1266794 | 12/2002 |
| EP | 1 075 984 | 5/2003 |
| EP | 1323573 | 7/2003 |
| EP | 1349746 | 8/2005 |
| FR | 1266925 | 9/1960 |
| FR | 2599683 | 6/1986 |
| FR | 2630056 | 10/1989 |
| FR | 2694527 A1 | 2/1994 |
| FR | 2845318 | 4/2004 |

| | | |
|---|---|---|
| JP | 1171509 | 7/1989 |
| JP | 5277020 | 10/1993 |
| JP | 8285423 | 11/1996 |
| JP | 10044756 | 2/1998 |
| JP | 2000125990 | 2/2000 |
| JP | 2001071800 | 3/2001 |
| JP | 2002125801 | 5/2002 |
| JP | 2002225539 | 8/2002 |
| JP | 2002234332 | 8/2002 |
| JP | 2003042594 | 2/2003 |
| JP | 2004224108 | 8/2004 |
| JP | 2004283403 | 10/2004 |
| SE | 202556 | 3/1966 |
| SE | 0102983 | 3/2003 |
| WO | WO 91/12150 | 8/1991 |
| WO | WO 94/09684 A1 | 5/1994 |
| WO | WO 96/05475 | 2/1996 |
| WO | WO 97/09908 | 3/1997 |
| WO | WO 99/00268 | 1/1999 |
| WO | WO 02/06914 A1 | 1/2002 |
| WO | WO 02/053410 | 7/2002 |
| WO | WO 03/015583 A2 | 2/2003 |
| WO | WO 03/051666 | 6/2003 |
| WO | WO 03/077710 | 9/2003 |
| WO | WO 03/101777 | 12/2003 |
| WO | WO 03/106215 | 12/2003 |
| WO | WO 2004/082989 | 3/2004 |
| WO | WO 04/028857 | 4/2004 |
| WO | WO 04/078517 | 9/2004 |
| WO | WO 04/091966 | 10/2004 |
| WO | WO 04/091967 | 10/2004 |
| WO | WO 04/096601 | 11/2004 |
| WO | WO 04/096602 | 11/2004 |
| WO | WO 05/021320 | 3/2005 |
| WO | WO 05/035305 | 4/2005 |
| WO | WO 05/042299 | 5/2005 |
| WO | WO 05/042301 | 5/2005 |
| WO | WO 05/047056 | 5/2005 |
| WO | WO 05/068253 | 7/2005 |
| WO | WO 05/110806 | 11/2005 |

OTHER PUBLICATIONS

Automotive Seat Heating Systems, Bauerhin International, received by Assignee W.E.T. Automotive Systems, May 2002.
Excerpt from website http://www.icar.com/html_pages/about_icar/current_events_news/advantage/advantageI-Car Advantage Online.
Excerpt from website http://www.seatcomfort.com/semashow1.htm, Specializing in Seat Ventilation and Heating Systems, Seat Comfort Systems Unveils 3 New Seat Heater Products.
Excerpt from website http://www.seatcomfort.com/ventilation.htm, Specializing in Seat Ventilation and Heating Systems, Ventilation.
GMT 830 Heating & Ventilation System, IGB Automotive Ltd., received by Assignee W.E.T. Automotive Systems, Jun. 2003.
International Search Report for Application Ser. No. PCT/US03/19929, Oct. 10, 2003.
Komfortabel bei jeder Temperatur.
Seat Having Systems, Kongsberg Automotive, believed to be from websitehttp://www.kongsberg-automotive.no/.

* cited by examiner

AIR CONDITIONED SEAT AND AIR CONDITIONING APPARATUS FOR A VENTILATED SEAT

TECHNICAL FIELD

The invention relates to a vehicle seat and, more particularly, concerns an air conditioned seat with a padded seat surface and backrest, and a fan arranged beneath the seat surface.

BACKGROUND OF THE INVENTION

Air conditioned seats are known from the automotive industry and aircraft construction. A customary arrangement consists of a seat provided with at least one device for the supply of air whose seat and backrest surfaces are each provided with air outlets or with an air-permeable fabric structure. The air supply device typically includes an axial flow fan arranged in the seat surface and one in the backrest surface, each of which draws in air from the environment and directs it through air ducts in the seat to the surfaces facing a person sitting in the seat.

U.S. Pat. No. 6,048,024 describes a ventilated seat that is equipped with a fan device beneath a seat surface and one in a backrest surface. Each of the fan devices draws air out of the seat through openings in the seat and backrest surfaces and discharges it to the environment. Both fan devices are designed as axial flow fans or as axial/radial flow fans.

A ventilation device for an air-conditioned seat is additionally known from DE 101 16 45 A1. In that case, an axial flow fan is provided on an underside of a seat surface that draws air from the environment and conveys it through channels in the seat cushion to air outlets of a seat surface.

The axial flow fan, in particular, that is located in the seat surface, generally projects downward from the underside of the seat and thus into a footwell of a rear seat passenger sitting behind the air conditioned seat. This axial flow fan must be provided with an additional cover to protect it from damage. Thus, there exists a need for an improved fan arrangement within a vehicle seat to make available an air supply device for an air conditioned seat, or an air conditioning apparatus for a ventilated seat, that is robust and reliably protected all around, and avoids the disadvantages of the prior art.

SUMMARY OF THE INVENTION

The present invention provides an air conditioned seat with a padded seat surface and padded backrest, with a fan arranged beneath the seat surface. The fan is connected to an air distribution apparatus in the seat and has a flow region that is open to the environment. The flow region is located substantially on the side of the fan facing the seat surface.

The disclosed embodiment is advantageous in that the fan drive is protected against the penetration of splashes and muddy water from the footwell of a rear seat passenger and also against damage from the rear seat passenger's feet. Moreover, the inlet opening of the fan is not visible and is tamperproof.

One embodiment of the invention provides a flexible bellows between the outlet opening of the radial flow fan and at least one air duct in the seat, permitting relative motion between the cushion and the fan caused by a person sitting or moving during vehicle operation. The underside of the seat can execute gentle vertical and horizontal motions while the fan itself preferably is rigidly anchored to a seat frame. At the same time, the flexible bellows serves to redirect the airflow by approximately 90 degrees from a horizontal direction to a vertical upward direction. The bellows preferably directs the flow of air into an air distribution structure in the seat surface, which may be connected by air ducts to air outlets or an air-permeable fabric of the seat surface if desired.

Another embodiment of the invention provides for a diffuser to be arranged around the air intake opening of the radial fan to guide the air that is drawn in. Between a top edge of the diffuser and the underside of the seat, there can be arranged a slit opening that can have a width of approximately 10 mm. This air guide improves the protection of the fan against blockage by objects or body parts penetrating from the footwell, and thus simultaneously provides very effective tamper-proofing from children at play or debris. The diffuser generally improves the protection of the fan drive from damage and from the penetration of water or moisture. Moreover, improved protection from penetration of large dust and dirt particles can also be achieved by this means, since the particles are substantially prevented from reaching the fan drive by a labyrinthine air guide due to the slit opening.

If desired, a dust or particle filter or a fine screen may be arranged between the slit opening and the air intake opening of the radial fan; this further protects the fan drive from the entry of foreign particles. To improve mechanical protection of the fan, its housing can be hermetically sealed with respect to the environment. The slit opening comprises the only opening to the outside, since the outlet opening is closed to the outside by means of the flexible bellows. The diffuser can also be rigidly connected to the housing which is sealed to the outside. The housing itself is firmly anchored to the seat and has a relatively robust structure for mechanical protection of the fan, protecting it from external damage.

Another alternative embodiment provides for an identical type radial fan to also be arranged in the backrest of the seat, which however preferably has an air guide that is covered with respect to the outside. Due to its visibility and the possibility of contact by a rear seat passenger, the backrest should in this case have a cover such that the air intake opening is arranged at a lower edge of the backrest facing the floor, for example. Moreover, a radial/axial fan may be used instead of a purely radial fan.

The air conditioned seat in accordance with the invention may be a vehicle seat or an airplane seat, for example.

The use of a radial fan as opposed to an axial fan makes possible a higher airflow, since a radial fan typically has a fan characteristic with a steeper pressure curve. Greater obstruction of the airflow system, for example by heavy passengers or dirty air ducts, causes less reduction in the airflow volume, and hence in system performance, with a radial fan.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DESCRIPTION OF THE PREFERRED EMBODIMENT(S)

In the following description, various operating parameters and components are disclosed for two exemplary embodiments. These specific parameters and components are included as examples and are not meant to be limiting.

Figure 1:
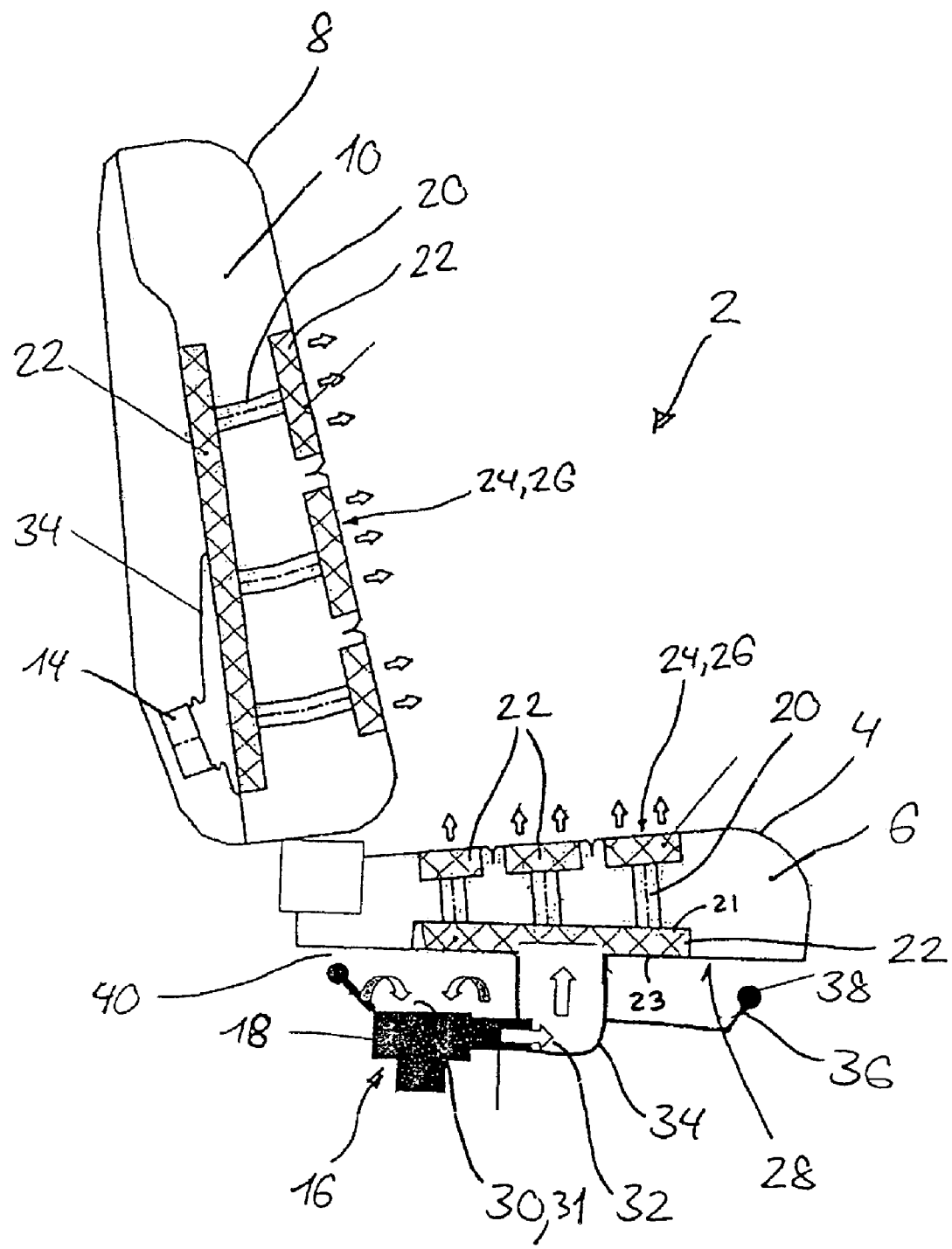
FIG. 1 is a schematic representation of an air conditioned seat according to one embodiment of the present invention.

FIG. 1 shows a schematic representation of an air conditioned seat 2 in accordance with one embodiment of the invention. The seat 2 includes an approximately horizontal seat surface 4 and a backrest 8 that is attached thereto in either a fixed or rotatable manner. For improved seating comfort, the seat surface 4 has a resilient seat cushion 6 and the backrest 8 has a resilient backrest cushion 10. In particular, the seat cushion 6 and backrest cushion 10 may be made of foam or the like. If desired, a spring core may also be provided in each of these. An underside 28 of the seat surface 4 is anchored to a floor—possibly in a sliding manner—by means of a seat frame by known methods and arrangements. Such a seat 2 in accordance with the invention may be used for example in a vehicle, such as a motor vehicle, or also in an airplane.

Provided on the rear side within the backrest 8 is an axial fan 14, which draws air from the environment and conveys it through a flexible bellows 34 to an air distribution structure 22. From there, the air is conveyed through air ducts 20 to regions near the surface of the backrest 8, where further regions may, for example, be provided with air distribution structures 22 through which the air is conveyed to air outlets 24 or to an air-permeable fabric 26. In the case of leather upholstery, in particular, air outlets 24 are typically used. Conversely, in the case of fabric upholstery, an air-permeable fabric 26 through which the air can pass to the outside is used on the surface of the backrest 8.

A similar air distribution structure 22 is provided in the seat surface 4. Here, too, several air ducts 20 are arranged within the seat cushion 6, through which air that has been drawn in by an air supply device is conveyed to the surface upon which a person can sit. In regions near the top of the seat surface 4, air distribution structures 22 are provided, each of which communicates with an air duct 20. Here, too, the air can pass to the outside, again through air outlets 24 or through an air-permeable fabric 26.

An air distribution structure 22 on the underside 28 of the seat surface 4 communicates at one upper surface 21 with the air ducts 20. At its lower surface 23, it opens into a flexible bellows 34, which establishes an air-carrying connection to an outlet opening 32 of the air supply device. In the example embodiment shown, the device to supply air to the seat surface 4 is a radial flow fan 16 with an outlet direction 32 approximately parallel to the top of the seat surface 4 and with an air intake opening 30 directed essentially toward the underside 28 of the seat surface 4. Thus, the flow region 31 is located between the fan 16 and the underside 28 of the seat surface 4.

Arranged around the air intake opening 30 is a diffuser 36 that is connected to the otherwise sealed housing 18 of the radial flow fan 16. The diffuser 36 opens out upward in a conical shape from the air intake opening 30 and provides a slit opening 40 between a top edge 38 and the underside 28 of the seat surface 4. The slit opening 40 preferably has a width that prevents the passage of relatively large particles. For example, the slit can be on the order of approximately 10 mm wide. If desired, the slit opening 40 may be equipped with a dust or particle filter 42, for example in the form of a fine-meshed fabric or the like (see FIG. 2). The housing 18 is preferably hermetically sealed and fastened to a seat pan or the seat frame (not shown), and thus has a secure anchoring to the seat 2. The bellows 34 permits motion of the outlet opening 32 relative to the air distribution structure 20 on the underside 28 of the seat surface 4.

Figure 2:
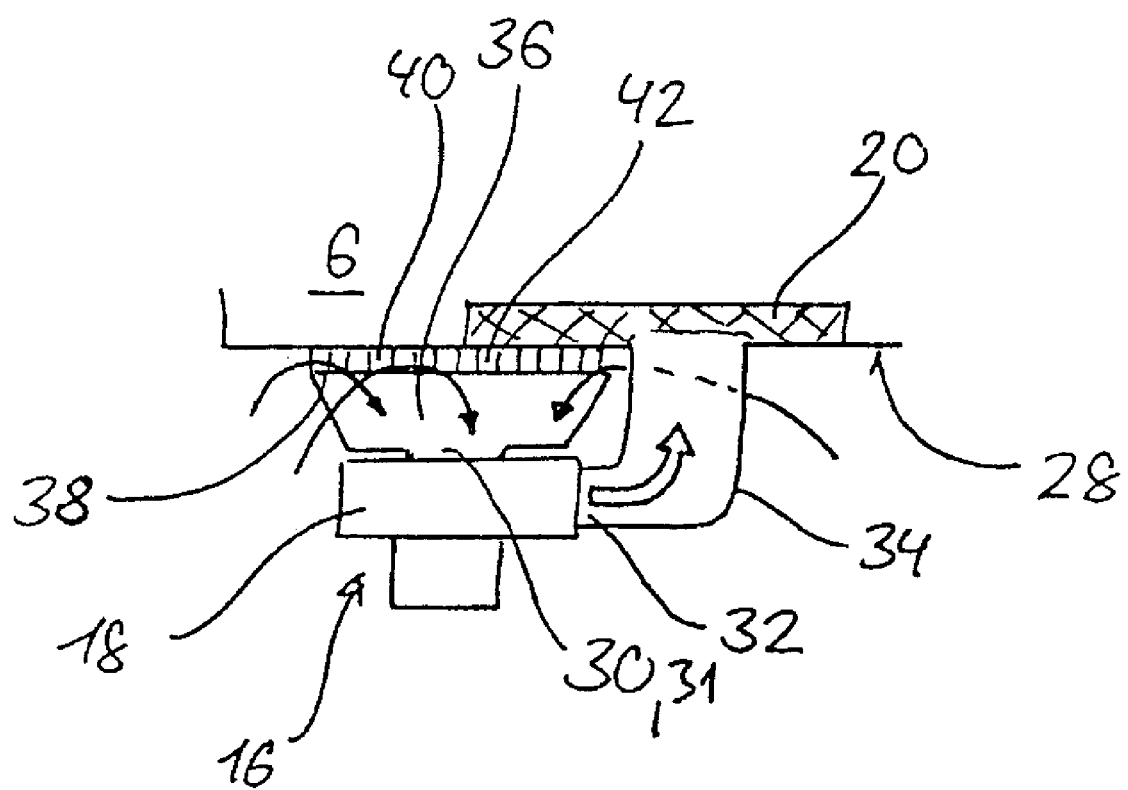
FIG. 2 is an air conditioning apparatus according to the invention for a ventilated seat.

FIG. 2 shows a schematic representation of an air conditioning apparatus according to an embodiment of the invention for a ventilated seat 2. The air conditioning apparatus corresponds essentially to the arrangement already described with regard to FIG. 1. Consequently, parts that are the same as in FIG. 1 are labeled with the same reference number and for the most part are not explained again. Unlike the arrangement in FIG. 1, a filter 42 or a screen that fills the slit opening 40 is provided between the top edge 38 of the diffuser 36 and the underside 28 of the seat surface 4. The diffuser 36 may have different sizes, as is indicated in FIGS. 1 and 2. FIG. 1 shows a relatively large diffuser 36, which extends over most of the underside 28 of the seat surface 4. FIG. 2 shows a smaller diffuser 36, which has roughly the same size as the housing 18 of the radial fan 16. Because of the arrangement according to the invention with the narrow slit opening 40 facing the underside 28 of the seat 2, however, a filter 42 or screen can be omitted, as a general rule.

The arrangement shown of the radial fan 16 in the air conditioned seat 2 has many advantages. The closed and mechanically robust housing 18 and the sturdy diffuser 36 connected thereto represent reliable protection from damage due to external influences. Since the radial fan is located in the footwell of a passenger sitting behind the seat 2, it can be damaged accidentally if its construction is not sufficiently sturdy. This is largely prevented by the robust design and the firm anchoring to the seat frame.

Furthermore, the arrangement of the slit opening directly beneath the underside 28 of the seat 2 provides protection from tampering and also represents a splashguard to prevent the penetration of moisture. In addition, protection from the penetration of particles and, in certain circumstances, from the penetration of dust can be assured. As a result of the air intake from above, a labyrinth-like air guide is produced that reliably prevents the penetration of particles, water or other environmental debris. The narrow width of the slit opening of approximately 10 mm, when the seat is occupied, represents protection against unintentional intervention. Moreover, protection against blockage is assured by the arrangement, since objects cannot reach the radial fan and tampering, for example by children at play, is nearly impossible, making the fan system potentially safer.

Preferably, ambient air is drawn in by the fan and blown into the seat. The fan can also be operated in the reverse direction, however. This would cause air to be drawn out from the seat and blown out beneath the seat. The arrangement described would distribute the exhaust airflow well. Objectionable, concentrated airflows would thus be avoided.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An air conditioned seat comprising:
   a padded seat with one or more air ducts within a seat cushion and with upholstery covering the seat cushion; and
   a fan arranged beneath the seat, the fan including an air intake opening, the fan being connected to an air distribution apparatus through the one or more air ducts, where the air distribution apparatus is located beneath the upholstery covering and includes a flow region that is open to the environment, wherein the air intake opening is directed toward an underside of the seat.

2. An air conditioned seat according to claim 1, wherein the fan is a radial fan.

3. An air conditioned seat according to claim 2, wherein the fan has an outlet opening aimed approximately parallel to the underside of the seat.

4. An air conditioned seat according to claim 3 comprising a flexible bellows located between the outlet opening of the fan and at least one air duct in the seat.

5. An air conditioned seat according to claim 2, wherein the radial fan is anchored in a seat frame.

6. An air conditioned seat according to claim 2 comprising a slit opening located in the flow region to guide the air that is drawn into the fan.

7. An air conditioned seat according to claim 6, comprising a diffuser.

8. An air conditioned seat according to claim 7, wherein the slit opening is provided between a top edge of the diffuser and the underside of the seat.

9. An air conditioned seat according to claim 8 comprising a dust or particle filter arranged between the slit opening and the fan.

10. An air conditioned seat according to claim 2, wherein a housing of the radial fan is hermetically sealed with respect to the environment.

11. An air conditioned seat according to claim 1, wherein the seat is a vehicle seat or an airplane seat.

12. An air conditioned seat comprising:
    a seating cushion with at least one air duct within the seating cushion and an air distribution apparatus comprising an air distribution structure along each of an underside and a top side of the seating cushion, wherein the at least one air duct connects the air distribution structures, and
    a fan arranged beneath the seating cushion, the fan being connected to the air distribution apparatus in the seating cushion, wherein an air intake opening of the fan is directed toward an underside of the seating cushion.

13. An air conditioned seat according to claim 12 wherein the air distribution apparatus comprises a flow region open to the environment.

14. An air conditioned seat according to claim 12 wherein the fan has an outlet opening aimed approximately parallel to the underside of the seating cushion.

15. An air conditioned seat according to claim 14 comprising a flexible bellows located between the outlet opening of the fan and an inlet to the air distribution apparatus.

16. An air conditioned seat according to claim 12 comprising a slit opening located in the flow region to guide air that is drawn into the fan.

17. An air conditioned seat according to claim 16 comprising a diffuser.

18. An air conditioned seat according to claim 17 wherein the slit opening is provided between a top edge of the diffuser and the underside of the seating cushion.

19. An air conditioned seat according to claim 18 comprising a dust or particle filter arranged between the slit opening and the fan.

20. An air conditioned seat according to claim 12 comprising a second fan arranged in a backrest.

21. An air conditioned seat according to claim 12, wherein the fan is a radial fan.

22. An air conditioned seat according to claim 21 wherein the radial fan is anchored in a seat frame.

* * * * *